(12) United States Patent
Casuse et al.

(10) Patent No.: US 12,504,395 B1
(45) Date of Patent: Dec. 23, 2025

(54) THIN FILM FOR AQUEOUS ELECTROCHEMICAL HEAVY METAL DETECTION AND METHODS THEREOF

(71) Applicant: UNM RAINFOREST INNOVATIONS, Albuquerque, NM (US)

(72) Inventors: Tybur Casuse, Albuquerque, NM (US); Jose Manuel Cerrato Corrales, Albuquerque, NM (US); Fernando Garzon, Albuquerque, NM (US)

( * ) Notice: Subject to any disclaimer, the term of this patent is extended or adjusted under 35 U.S.C. 154(b) by 651 days.

(21) Appl. No.: 17/885,713

(22) Filed: Aug. 11, 2022

Related U.S. Application Data

(60) Provisional application No. 63/232,342, filed on Aug. 12, 2021.

(51) Int. Cl.
*G01N 33/18* (2006.01)
*G01N 27/30* (2006.01)
*G01N 27/42* (2006.01)

(52) U.S. Cl.
CPC ............. *G01N 27/30* (2013.01); *G01N 27/42* (2013.01); *G01N 33/1813* (2013.01); *G01N 33/1826* (2013.01)

(58) Field of Classification Search
CPC .... G01N 27/30; G01N 27/42; G01N 33/1813; G01N 33/1826; G01N 33/20; G01N 33/48721
See application file for complete search history.

(56) References Cited

U.S. PATENT DOCUMENTS

| | | | |
|---|---|---|---|
| 8,648,605 B2 * | 2/2014 | Nakamura | G01N 27/42 204/403.01 |
| 2013/0248378 A1 * | 9/2013 | Kanemoto | G01N 27/3271 205/641 |

* cited by examiner

*Primary Examiner* — Gurpreet Kaur
(74) *Attorney, Agent, or Firm* — MH2 Technology Law Group LLP

(57) ABSTRACT

A device for aqueous electrochemical analysis a sensor is disclosed, which may include a sensing electrode having a thin film surface, a counter electrode coupled to the sensing electrode, and a reference electrode coupled to the sensing electrode and the counter electrode. The device also includes where the thin film surface of the sensing electrode may include a uniaxial texture that is normal to a plane of the thin film surface. A method for aqueous electrochemical analysis is also disclosed, including exposing an aqueous sample to a sensor including a sensing electrode having a thin film surface, where the thin film surface of the sensing electrode may include a uniaxial texture that is normal to a plane of the thin film surface.

18 Claims, 13 Drawing Sheets

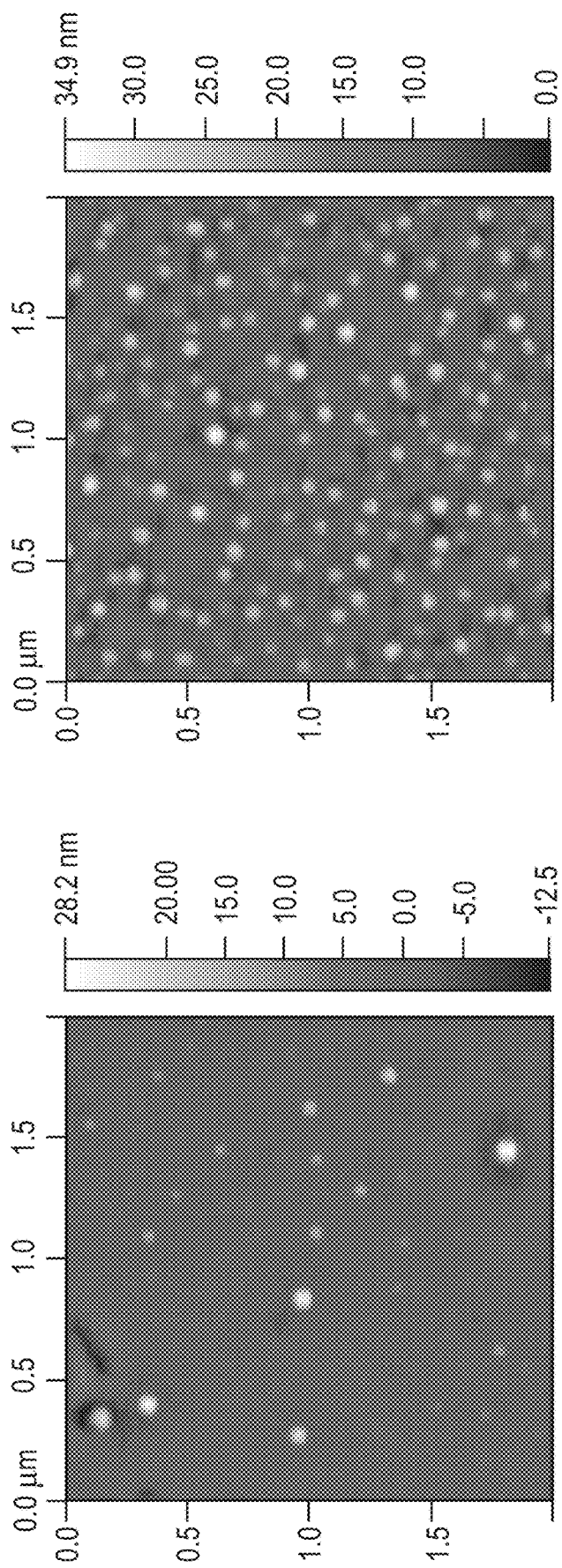

THIN FILM FOR AQUEOUS ELECTROCHEMICAL HEAVY METAL DETECTION AND METHODS THEREOF

CROSS REFERENCE TO RELATED APPLICATIONS

This application claims to the benefit of U.S. Provisional Patent Application No. 63/232,342 filed on Aug. 12, 2021, which is hereby incorporated by reference in its entirety.

TECHNICAL FIELD

The present teachings relate generally to thin films used in chemical sensing applications and, more particularly, to thin films having controlled properties for heavy metal detection.

BACKGROUND

Continuous and in-situ sampling, monitoring, and analysis of heavy metals and other analytes to evaluate water quality in aquifers during well drilling and other ground water monitoring applications would be advantageous to insure improved environmental monitoring, accurate industrial wastewater remediation protocols, and reduced costs in water treatment. Unsafe concentrations of heavy metals in drinking water is a global health hazard afflicting many areas of the world. The United States Environmental Protection Agency and World Health Organization have set maximum contaminant limits as low at 10 parts per billion (10 micrograms per liter) in daily drinking water. Levels above 10 µg/L in drinking water in daily consumption can lead to renal toxicity and a condition known as arsenicosis, which produces lesions on the skin.

Conventional means of heavy metal and other analyses utilize a batch determination or analysis as opposed to continuous sampling, monitoring, and analysis. Batch determination of analytes in ground water samples do not account for differences in analyte concentrations based on variations in seasonal or climate fluctuations, geographical variations, or changes in heavy metal contaminants over time. Water may penetrate geological features differently depending on the aforementioned factors of depth or penetration of sampling may yield different results or take too long for analysis results from batch determination to make timely judgment based on the results.

Continuous and in-situ sampling, monitoring, and analysis of heavy metals and other analytes of interest provides several advantages, particularly at increased levels of sensitivity, or at lower detection limits. Electrochemical stripping analysis is highly capable of detecting at and below these harmful trace concentration levels. Increasing sensitivity is essential to informing the public of potentially dangerous concentrations of these contaminants in water sources. Additionally, it is common for natural waters to have multiple contaminants in solution. Therefore, there is a need to develop electrodes capable of presenting increased sensitivity and selectivity in consumable electrodes in a cost-effective method.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

A device for aqueous electrochemical analysis a sensor is disclosed, which may include a sensing electrode having a thin film surface, a counter electrode coupled to the sensing electrode, and a reference electrode coupled to the sensing electrode and the counter electrode. The device also includes where the thin film surface of the sensing electrode may include a uniaxial texture that is normal to a plane of the thin film surface.

Implementations of the device for aqueous electrochemical analysis include where the uniaxial texture may include (111) oriented grains. The thin film surface of the sensing electrode further may include a noble metal. The noble metal may include gold. The sensor is disposed on an integrated circuit. The sensor is configured to determine a concentration of a metal in an aqueous sample. The metal may include arsenic. The metal may include lead, copper, iron, chromium, uranium, cadmium, nickel, or a combination thereof. The sensor is configured to determine a concentration of an organic compound in an aqueous sample. The organic compound may include a phenol, alcohol, organophosphate, halogenated hydrocarbon, or a combination thereof.

A method for aqueous electrochemical analysis is also disclosed. The method for aqueous electrochemical analysis includes exposing an aqueous sample to a sensor which may include a sensing electrode having a thin film surface, where the thin film surface of the sensing electrode may include a uniaxial texture that is normal to a plane of the thin film surface. The method for aqueous electrochemical analysis also includes depositing an analyte present in the aqueous sample onto the thin film surface of the sensing electrode. The method also includes stripping the analyte from the thin film surface of the sensing electrode. The method also includes determining a concentration of the analyte in the aqueous sample.

Implementations of the method for aqueous electrochemical analysis where the uniaxial texture may include (111) oriented grains. The thin film surface of the sensing electrode further may include a noble metal. The noble metal may include gold. Stripping the analyte from the thin film surface of the sensing electrode produces a single peak. The analyte may include a metal. The metal may include arsenic. The metal may include lead, copper, iron, chromium, uranium, cadmium, nickel, or a combination thereof. The analyte may include an organic compound. The organic compound may include a phenol, alcohol, organophosphate, halogenated hydrocarbon, or a combination thereof. Implementations of the described techniques may include hardware, a method or process, or computer software on a computer-accessible medium.

The features, functions, and advantages that have been discussed can be achieved independently in various implementations or can be combined in yet other implementations further details of which can be seen with reference to the following description.

BRIEF DESCRIPTION OF THE DRAWINGS

The accompanying drawings, which are incorporated in and constitute a part of this specification, illustrate embodiments of the present teachings and together with the description, serve to explain the principles of the disclosure. In the figures:

FIGS. 9A and 9B depict atomic force microscopy images of an ultraflat Au (111) thin film and a generic Au (111) thin film, respectively, in accordance with the present disclosure.

It should be noted that some details of the figures have been simplified and are drawn to facilitate understanding of the present teachings rather than to maintain strict structural accuracy, detail, and scale.

DETAILED DESCRIPTION

Reference will now be made in detail to exemplary embodiments of the present teachings, examples of which are illustrated in the accompanying drawings. Wherever possible, the same reference numbers will be used throughout the drawings to refer to the same, similar, or like parts.

There is a current need for development and use of electrodes capable of providing increased sensitivity and selectivity in consumable electrodes while using a cost-effective method. Examples of the present disclosure provide the control of surface morphologies and crystallographic planes in sensing electrodes, which increases sensitivity and selectivity for electrochemical stripping analysis of trace heavy metals concentrations in water. This utilizes a thin film generated with crystallographically controlled metal deposition as a sensing electrode for implementation in a standard three electrode cell or lab on a chip sensor. Single crystal electrochemistry demonstrates that surface geometries are coupled with electrochemical site energies. Consequently, increased homogeneity of crystal orientation and surface morphology of a sensing electrode results in a narrower potential region for oxidation of the analyte to occur and a sharper peak. Increased peak height to background current increases the sensitivity for detection of trace concentrations of the analyte. A narrower potential region for oxidation increases selectivity by increasing separation of peaks related the analyte of interest and those of competing ions in solution. Additionally, the use of thin films decreases consumed precious metals and cost of electrode generation, resulting in a much lower cost in comparison to commercially available single crystal electrodes.

In general terms, electrochemical stripping analysis is an analytical chemistry method based on voltammetry or potentiometry that can be used for quantitative determination of ions in solution. Stripping voltammetry, including anodic, cathodic, and adsorptive varieties thereof, have can be used for analysis of organic molecules or metal ions. Stripping analysis includes steps of preconcentration of a metal phase or other analyte onto an electrode surface followed by selective oxidation of each analyte species during an anodic potential sweep. Stripping voltammetry is a cost-effective, sensitive, and reproducible method for trace metal ion analysis or other organic analytes in aqueous media having low concentration limits of detection in the low ppb to high ppt range. Associated stripping peak currents and peak widths are a function of the size, coverage and distribution of the analyte on the electrode surface.

Figure 1:
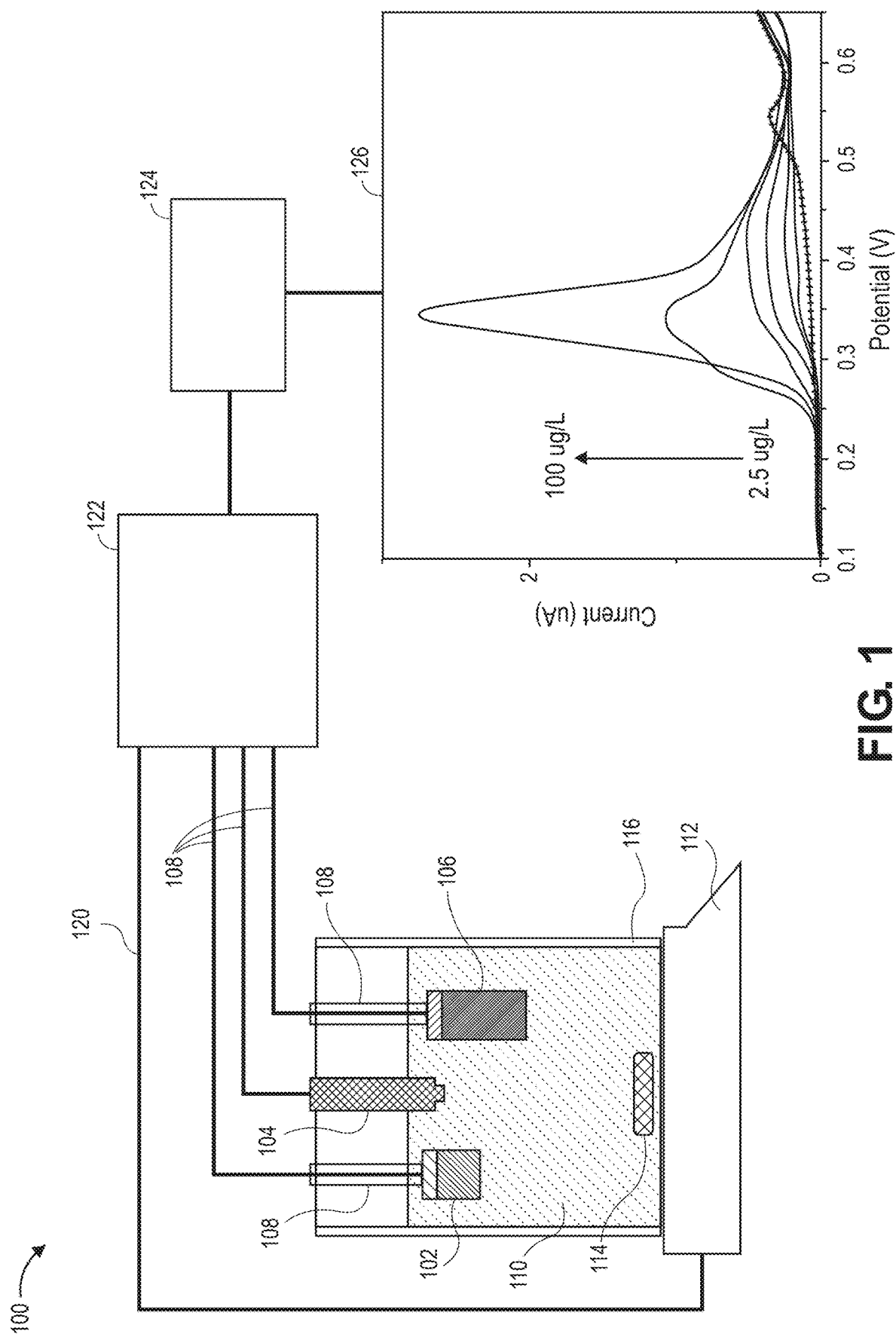
FIG. 1 is a schematic of an exemplary device for aqueous chemical analysis including one or more electrodes having increased sensitivity and selectivity, in accordance with the present disclosure.

FIG. 1 is a schematic of an exemplary device for aqueous chemical analysis including one or more electrodes having increased sensitivity and selectivity, in accordance with the present disclosure. A device for aqueous electrochemical analysis 100 includes a sensor, assembly, semiconductor chip, or other device including a sensing electrode 102 having a thin film surface. In certain examples, the device or sensor is disposed on an integrated circuit. The think film surface of the sensing electrode 102 includes a uniaxial texture that is normal to a plane of the thin film surface. In certain examples, the thin film surface can be ultraflat, as defined and characterized herein. The uniaxial texture of thin film surface has a high degree of (111) oriented grains. This highly oriented poly-oriented crystalline thin film has a high degree of (111) uniaxial texture that is normal or perpendicular to a plane of the thin film surface. In exemplary examples, the thin film electrode material is a noble metal film, such as gold, which has an advantage of chemical stability in many environments. Other examples of thin film electrode materials for use in devices of the present disclosure include platinum, bismuth, iridium, palladium, or combinations thereof. The electrode thin film is nominally a 0.1 µm film, where a range of thickness of the thin film can be from about 5 nm to about 10 µm but is only limited by complete substrate coverage on the lower end of the thickness range, and practically limited by expense of the thin film metal material on the upper end of the thickness range. An additional characteristic of interest for the thin film metal electrode of the present disclosure is surface flatness, as measured by roughness, which can impact sensitivity of the electrode when in use. While additional details on comparative surface roughness of thin film metal electrodes will be described herein, they can be dependent on the nature of the substrate onto which a thin film metal will be deposited. Substrates useful in sensing electrodes coated with a thin film metal include sapphire, aluminum oxides, such as corundum, silicon dioxide, quartz, silicon, or a combination thereof. Upon these flat substrates a highly oriented (111) metal surface texture can be deposited by known metal deposition methods, including physical vapor deposition (PVD) or chemical vapor deposition (CVD) techniques. The highly oriented (111) thin film surface electrodes of the present disclosure provide advantageous ability to measure one or more analytes by electrodeposition of the one or more analytes by reducing onto a metal surface. After preconcentration of the material onto a thin film electrode for a fixed time, a reverse potential is applied to oxidize the analyte from the thin metal surface at a higher concentration. This provides a means to identify the metal of interest and increase the peak beyond a background noise level. A highly oriented (111) thin film surface provides a higher peak to background ratio and narrower peak as compared to other oriented thin film surfaces. While other surfaces have additional sites that are not crystallographically similar, (111) thin film surfaces are closely packed and more regular in comparison.

In addition to the sensing electrode 102, the device for aqueous electrochemical analysis 100 includes a counter electrode 106 coupled to the sensing electrode and a reference electrode 104 coupled to the sensing electrode 102 and the counter electrode 106. One or more of the sensing electrode 102, the counter electrode 106, or the reference electrode 104 may have a non-conductive coating 108 over at least a portion of the electrodes 102, 104, 106 or over at least part of the electrical connections 118 attaching each of the electrodes 102, 104, 106 to a potentiostat 122. In an exemplary use, at least a portion of each of the electrodes 102, 104, 106 is submerged into an aqueous sample 110 held within a container or vessel 116. The vessel 116 can be but is not limited to a beaker, flask, test tube or other common piece of laboratory glassware. Examples include the use of a stirring plate 112 connected to a potentiostat 122 by way of an electrical connection 120 by which a stir bar 114 agitates the aqueous sample 110 held within the vessel 116, although in other exemplary examples, other means of sample agitation may be used, such as shaking, spinning, pumped fluid flow or other means of aqueous sample agitation known to those skilled in the art. The potentiostat 122 is connected to a microprocessor computer 124 or other means of calculating, processing, analyzing, or storing to generate data from a stripping voltammetry analyte procedure. The microprocessor computer 124 can include a computer readable medium comprising instructions which, when executed by at least one electronic processor, configure the potentiostat 122, the stirring plate 112, or other elements of the device 100 to execute a method for aqueous electrochemical analysis. Certain embodiments can further include a software or hardware application to allow a user to control the electronic processor. The software application can be, for example, a non-transitory computer readable medium storing instructions, that when executed by a hardware processor, performs a method of providing a graphical user interface on the display to allow a user to control parameters as described herein for aqueous electrochemical analysis. The software application or the computer readable medium or electronic processor can then provide further instructions to a user to execute the method for aqueous electrochemical analysis. Next, an output of the resulting data 126 can be calculated and/or generated with the use of the microprocessor computer 124. The sensor on the device 100 can be configured to determine a concentration of a metal in an aqueous sample, such as, but not limited to arsenic, lead, copper, iron, chromium, uranium, cadmium, nickel, or a combination thereof. The sensor can alternatively be used or configured to determine a concentration of an organic compound in an aqueous sample, such as, but not limited to aldehydes, ketones, organic acids, phenol, alcohols, organophosphates, halogenated hydrocarbons, or a combination thereof.

Figure 2A:
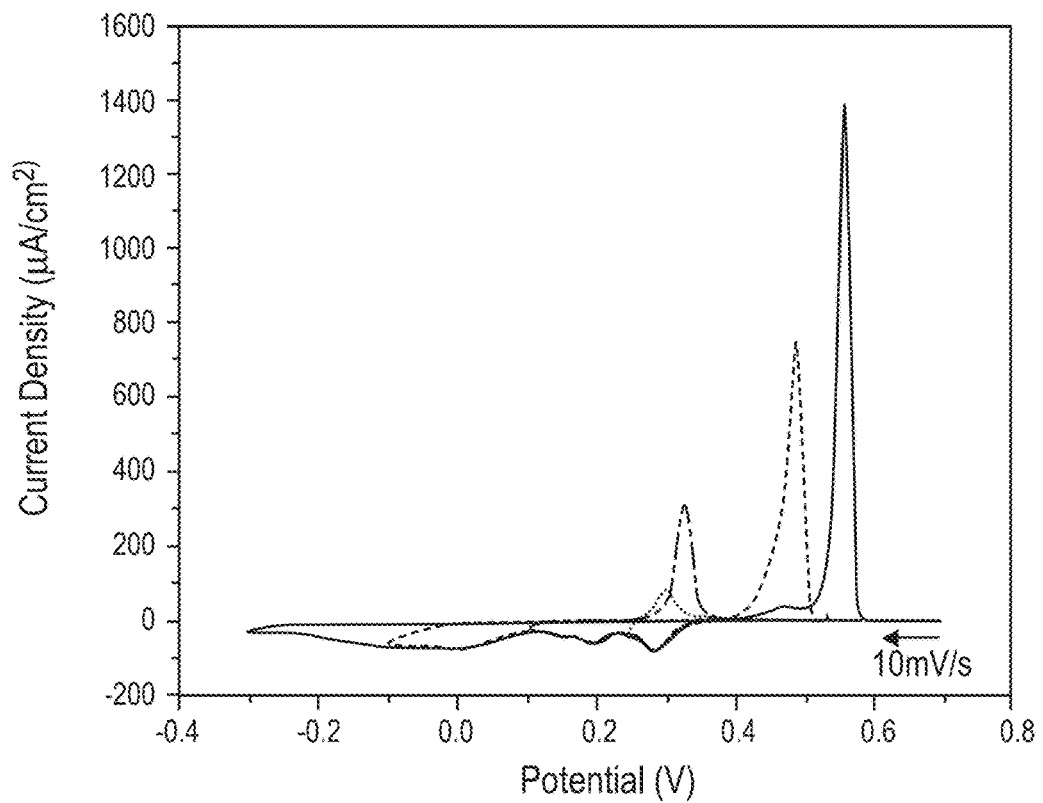
FIGS. 2A and 2B are graphs illustrating saturated adsorption on a poly-oriented single crystal electrode illustrating current density as a function of potential and charge density and monolayer thickness as a function of lower potential limit, in accordance with the present disclosure.
Figure 2B:
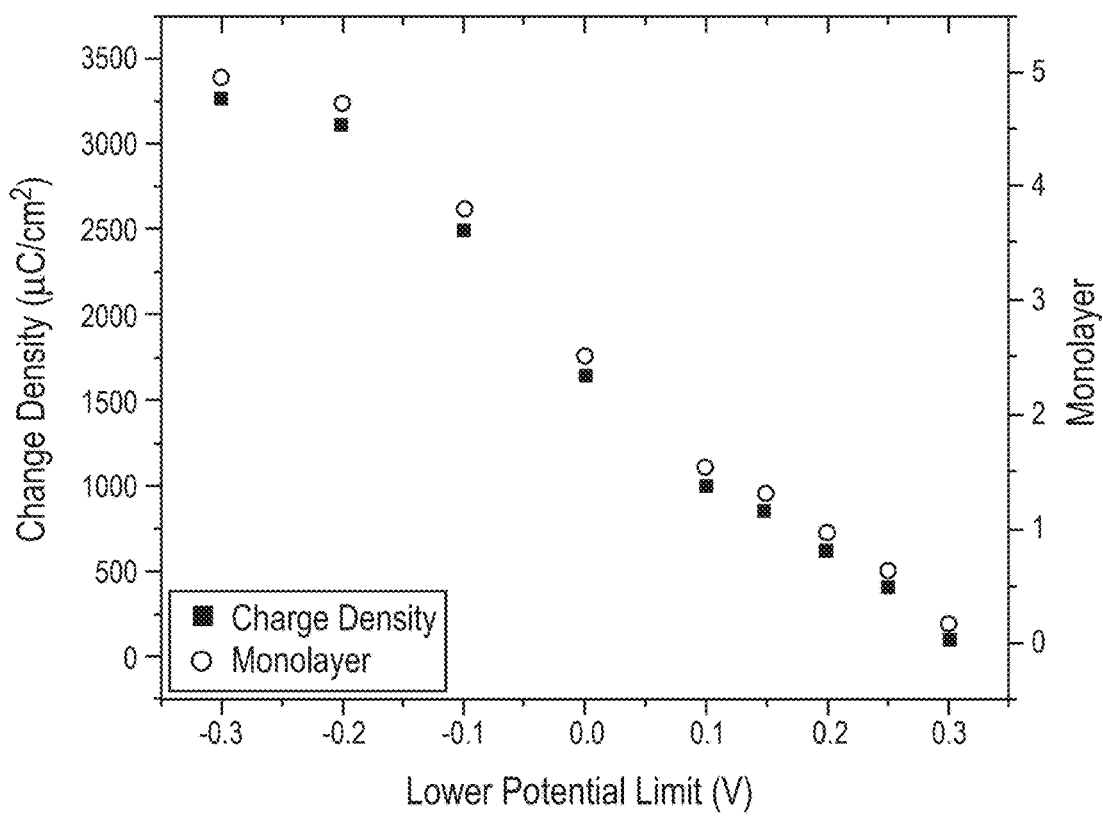

FIGS. 2A and 2B are graphs illustrating saturated adsorption on a poly-oriented single crystal electrode illustrating current density as a function of potential and charge density and monolayer thickness as a function of lower potential limit, in accordance with the present disclosure. As shown in FIG. 2A, the complex deposition process of a solution of $10^{-1}$M As (III) in 0.5M sulfuric acid with the use of a poly-oriented single crystalline electrode shows multiple peaks of varying widths, which can lead to difficulty in achieving sensitive and selective readings using such an electrode. FIG. 2B shows a decrease in charge density as the monolayer level decreases and as the lower potential limit increases. The complex deposition process as shown is a result of the use of a poly-oriented electrode poly-oriented single crystalline film having multiple surface orientations. The data in FIGS. 2A and 2B was generated using a negative initial scan direction at a rate of 10 mV/s.

Figure 3:
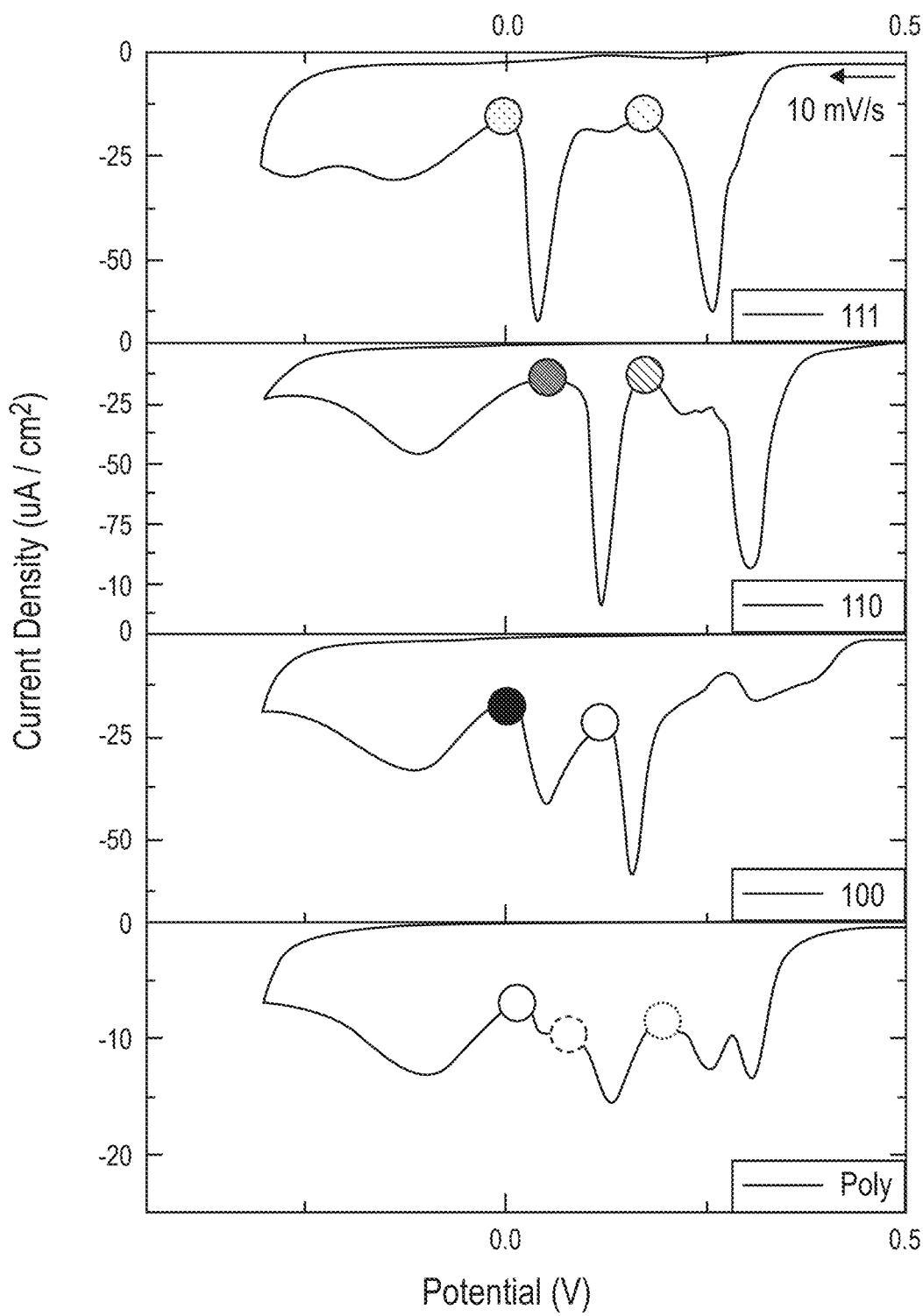
FIG. 3 is a set of graphs displaying current density as a function of potential for various crystallographic orientations on a single crystal electrode, in accordance with the present disclosure.

FIG. 3 is a set of graphs displaying current density as a function of potential for various crystallographic orientations on a single crystal electrode, in accordance with the present disclosure. FIG. 3 demonstrates the current density as a function of potential during a deposition process of a solution of $10^{-1}$M As (III) in 0.5M sulfuric acid with the use of a single (111) crystalline orientation, a single (110) orientation, a single (100) orientation, and a polycrystalline electrode, respectively, from top to bottom. One of the features that provide advantages for an electrode surface having a (111) orientation as described herein is its singular narrow peak when used in applications of stripping voltammetry, and in particular, analysis of heavy metals such as arsenic and other compounds. The sensitivity to detection and decrease of cross-interferences from the presence of ions other than the target analyte that can be stripped or oxidized at potentials close to the potential at which the target analyte is stripped or oxidized during measurement can also be provided with the use of electrodes and measurement methods of the present disclosure. The data in FIG. 3 was generated using a negative initial scan direction at a rate of 10 mV/s. The comparative experiments and results as depicted used a macroscopic gold single crystal that could either be completely immersed into the electrolyte solution, exposing multiple crystal surfaces such as the (111), (100) and (110) surfaces or a sole orientation surface could be tested by masking the other surfaces and only allowing for electrolyte contact to one surface. This way the behavior of the (111) texture thin films could be compared to the model single crystal (111) surface. As the thin film substrates use only ~2 µg of gold per assay the cost per assay is much smaller than using gold single crystals.

Figure 4A:
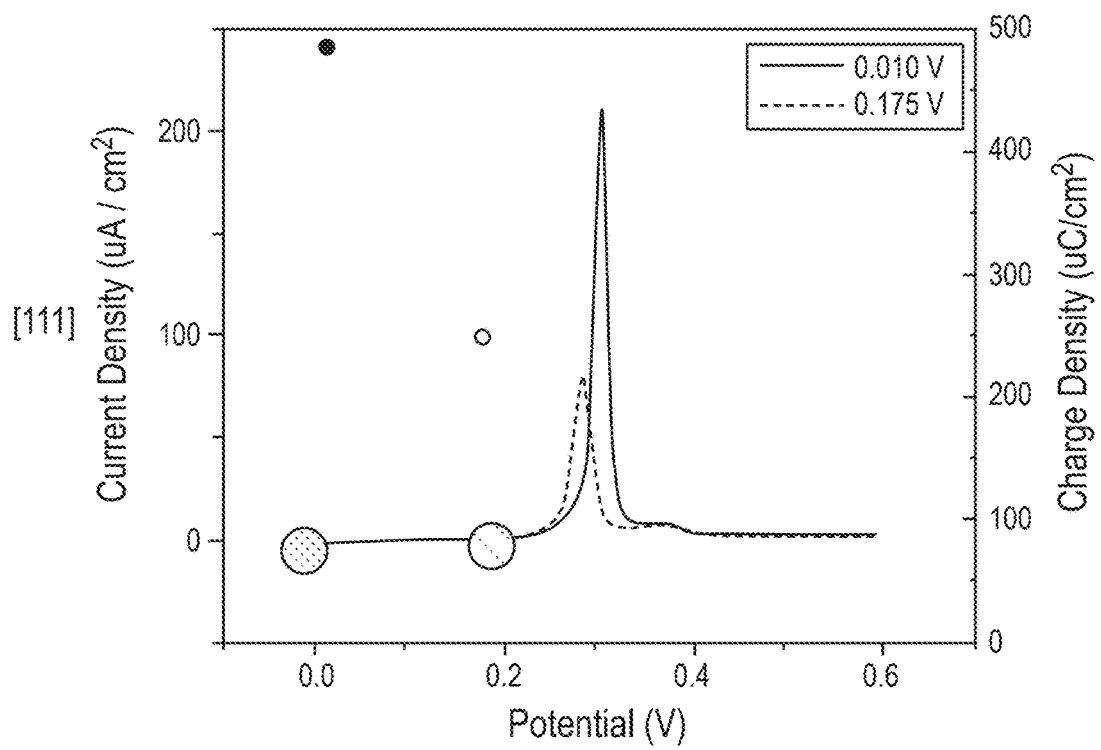
FIGS. 4A-4D is a set of graphs displaying current density as a function of potential for various crystallographic orientations on a single crystal electrode at various voltages, in accordance with the present disclosure.
Figure 4B:
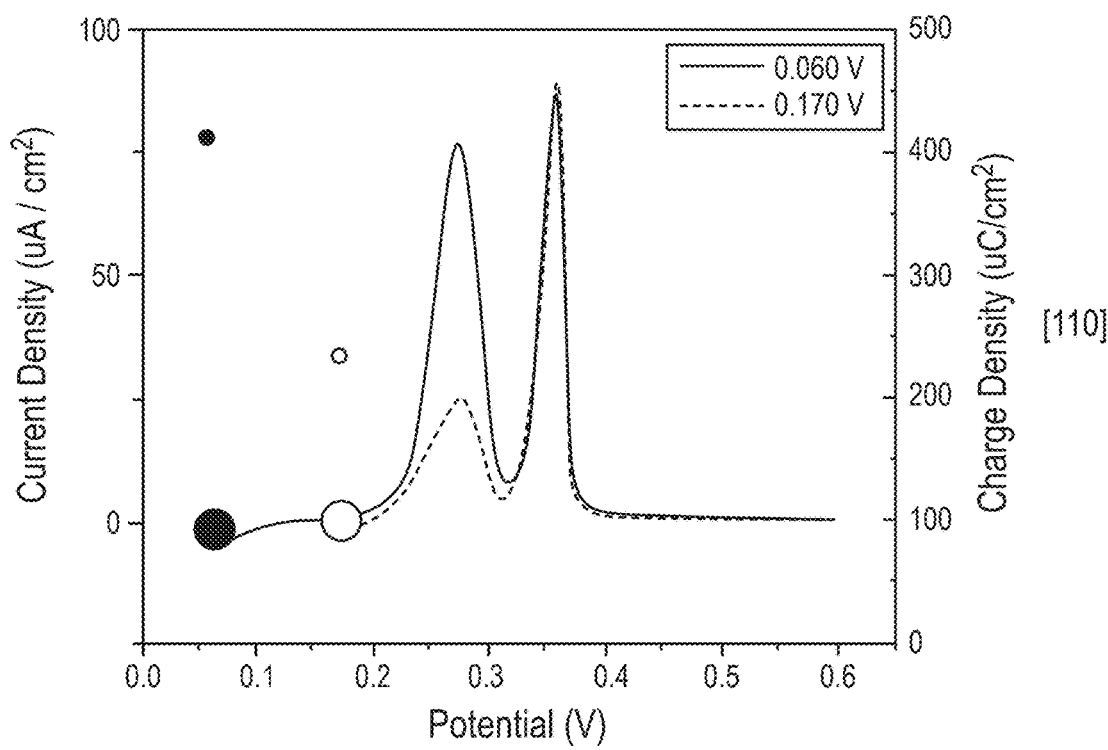
Figure 4C:
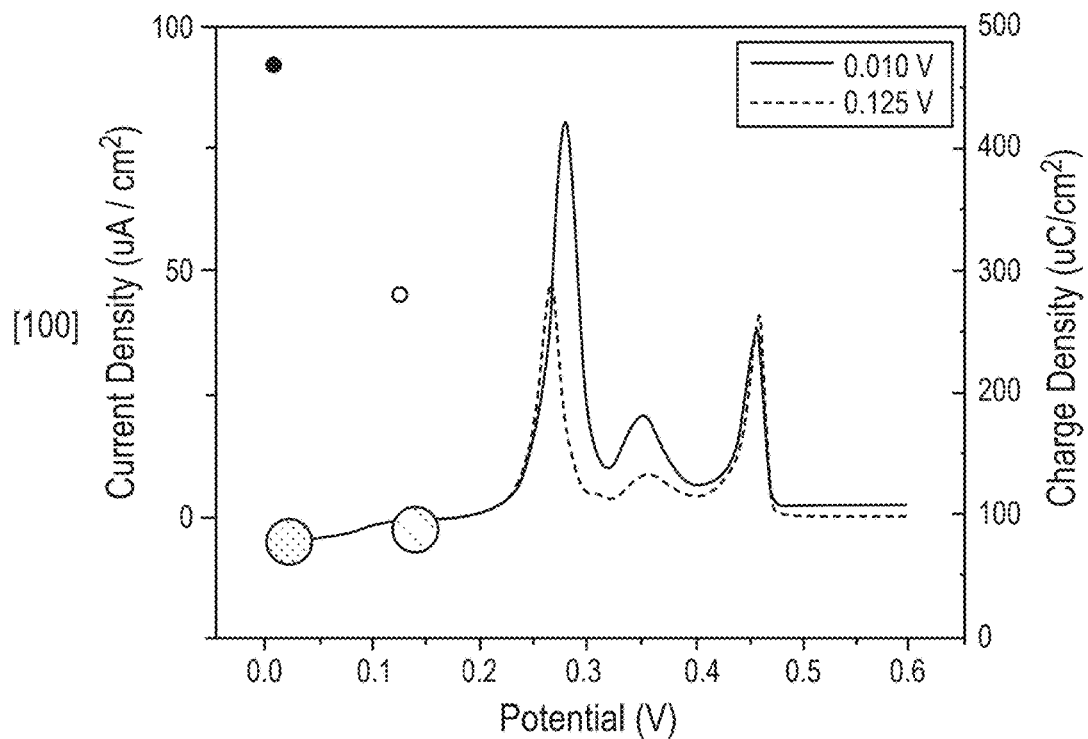
Figure 4D:
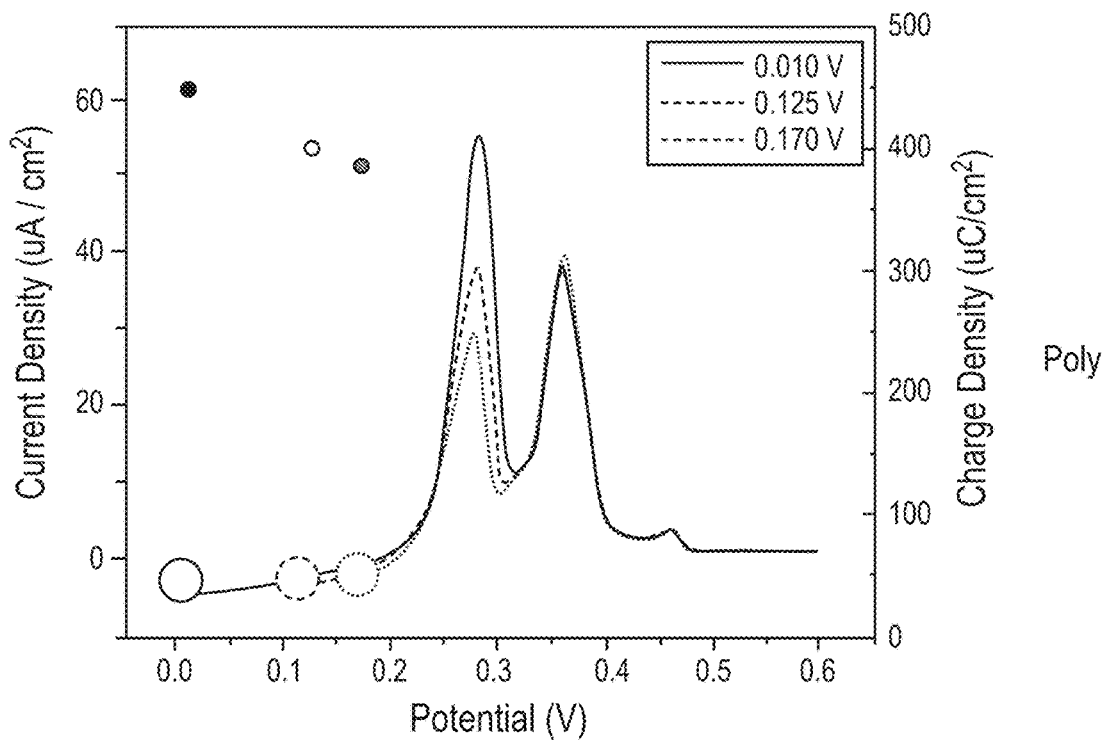
Figure 5:
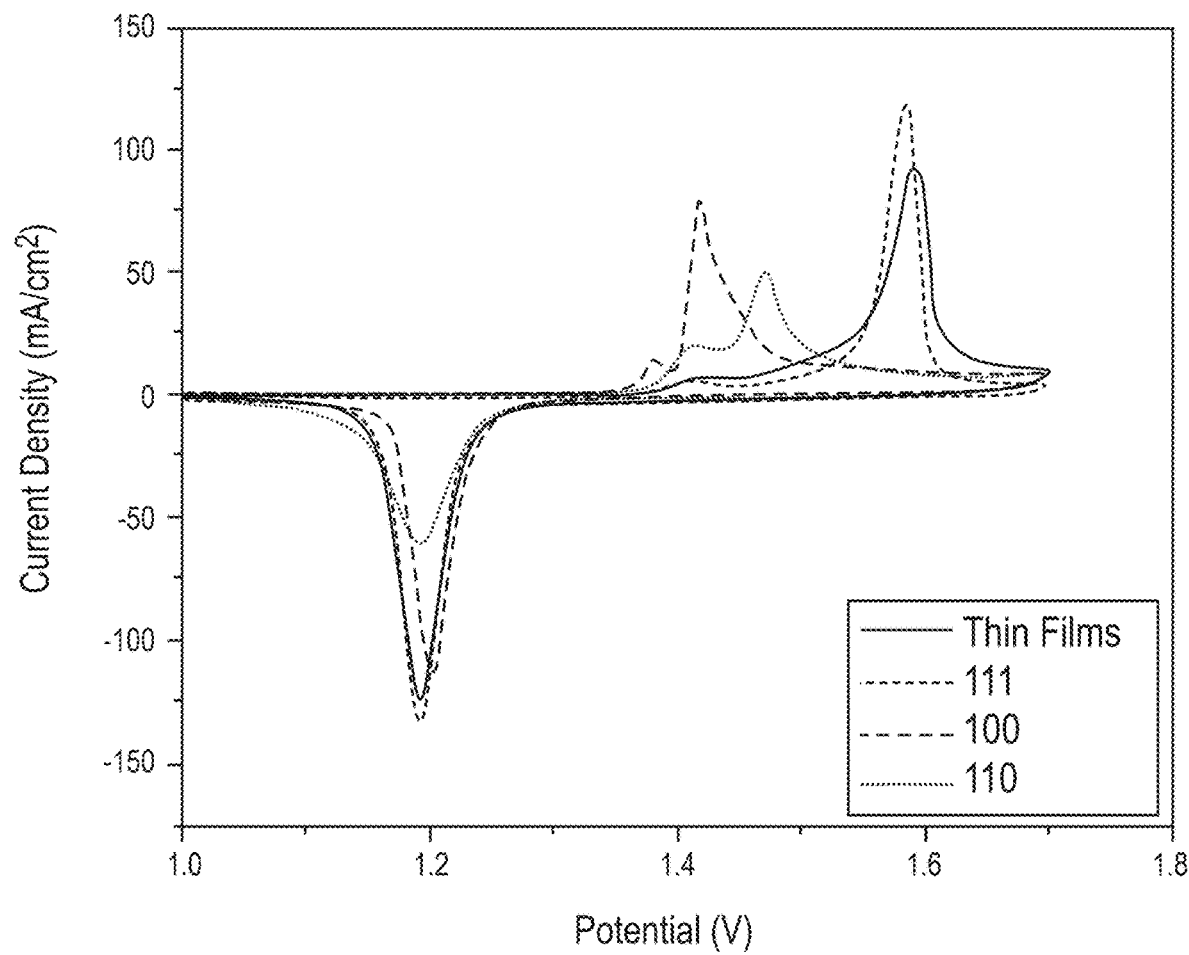
FIG. 5 is a graph displaying current density as a function of potential for various crystallographic orientations on single crystal electrodes and an ultraflat Au (111) thin film electrode at various voltages, in accordance with the present disclosure.

FIGS. 4A-4D is a set of graphs displaying current density as a function of potential for various crystallographic orientations on a single crystal electrode at various voltages, in accordance with the present disclosure. FIG. 4A depicts a measurement of $10^{-5}$ M As (III) in 0.5 M $H_2SO_4$ with an initial positive scan direction at 10 mV/s using an electrode with a thin film surface of (111) highly oriented texture. FIGS. 4B, 4C, and 4D include data from similar measurements utilizing an electrode with a thin film having a surface of (110), (100), and (poly) oriented surface texture, respectively. Data for each graph was generated with 0.010 V and 0.175 V. As compared to FIGS. 4B, 4C, and 4D, the measurements illustrated in FIG. 4A show a single, narrow peak for both 0.010 V and 0.175 V, where the data illustrated in FIGS. 4B, 4C, and 4D show multiple, broad peaks in the measurement data for those electrode thin film materials. This is indicative of an improved selectivity and sensitivity for the (111) highly oriented thin film surface texture as demonstrated in FIG. 4A, thus providing a measurement system and electrode material that is less likely to exhibit cross-contamination or other interference when used for electrolyte measurement. The various indicating circles shown in FIG. 3 and in FIGS. 4A-4D are placed at potentials values just after the peak offset during the negative sweep during analysis. These dots represent the potentials at which the deposition step of the linear stripping voltammetry in FIGS. 4A-4D are held before stripping. FIG. 5 is a graph displaying current density as a function of potential for various crystallographic orientations on single crystal surfaces and an ultraflat Au (111) thin film electrode at various voltages, in accordance with the present disclosure. The graph illustrates a peak at 1.6 V for both the (111) thin film and the single crystal electrode. This graph represents the electrochemical oxidation and reduction of gold which can be used to identify crystallographic orientations by observing the peak positions and shapes.

Figure 6A:
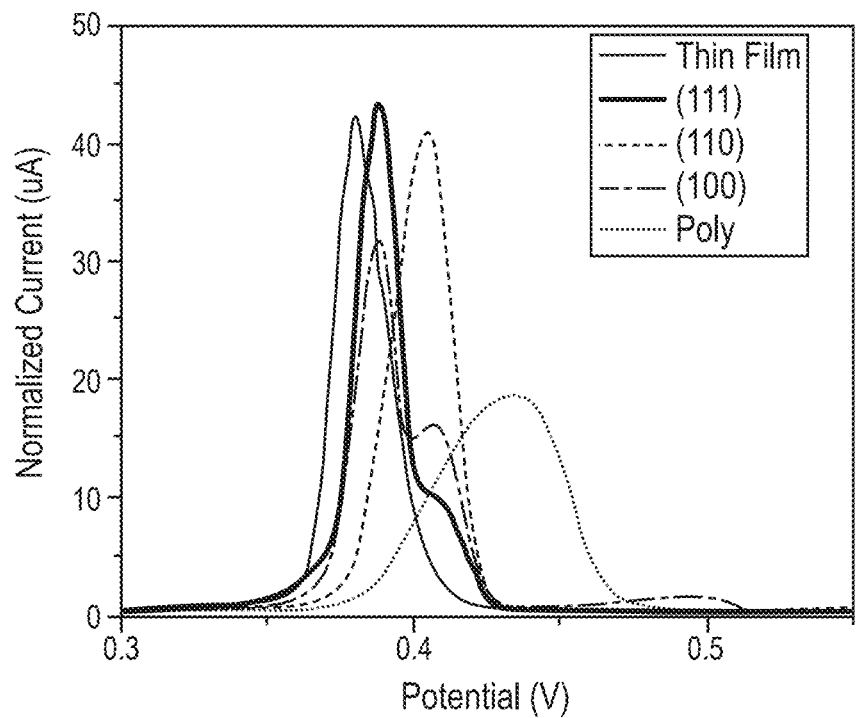
FIGS. 6A and 6B are a set of graphs displaying potential as a function of normalized current and a peak charge density for each electrode surface having various crystallographic orientations, respectively and an ultraflat Au (111) in accordance with the present disclosure.
Figure 6B:
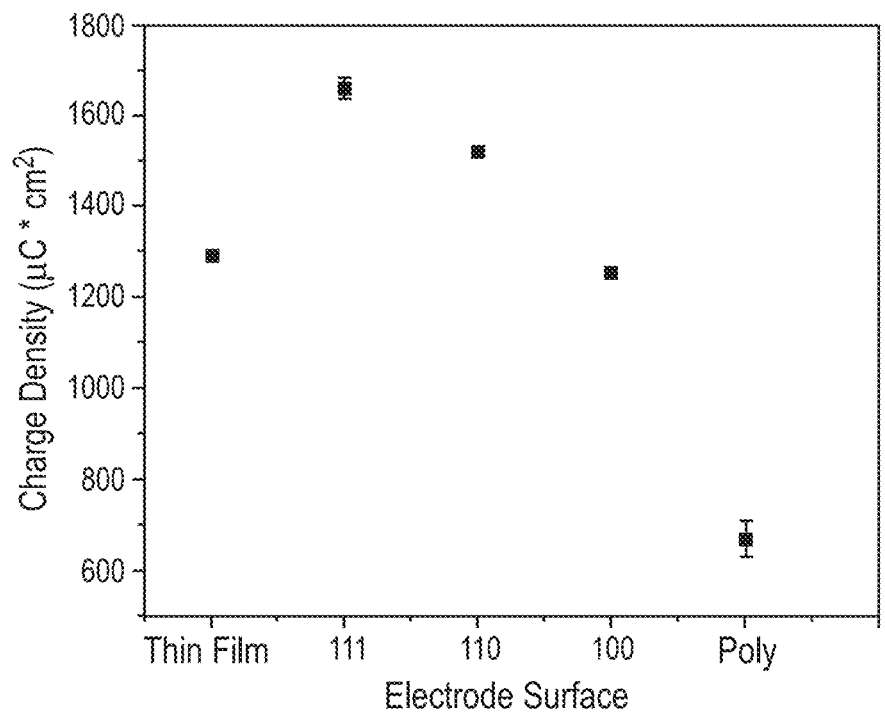

FIGS. 6A and 6B are a set of graphs displaying potential as a function of normalized current and a peak charge density for each electrode surface having various crystallographic orientations, respectively and an ultraflat Au (111) in accordance with the present disclosure. Using an electrode having a highly oriented thin film surface, behavior can be seen that is similar to characteristics of a (111) single crystal surface. In this case, the thin films can be grown with small amounts of gold at low-cost substrates. This provides a viable stripping voltammetry application using this highly oriented thin film surface in a commercial analysis application. Performance of heavy metal detection using a highly oriented thin film surface. The thin film orientation has been independently confirmed by X-ray diffraction and electron backscattering analysis. The advantages described herein for the purposes of stripping voltammetry are applicable and conferrable to other trace metal analytes such as arsenic, lead, copper, iron, chromium, uranium, cadmium, nickel, or a combination thereof and organic compounds such as aldehydes, ketones, organic acids, phenol, alcohols, organophosphates, halogenated hydrocarbons, or a combination thereof.

Figure 7A:
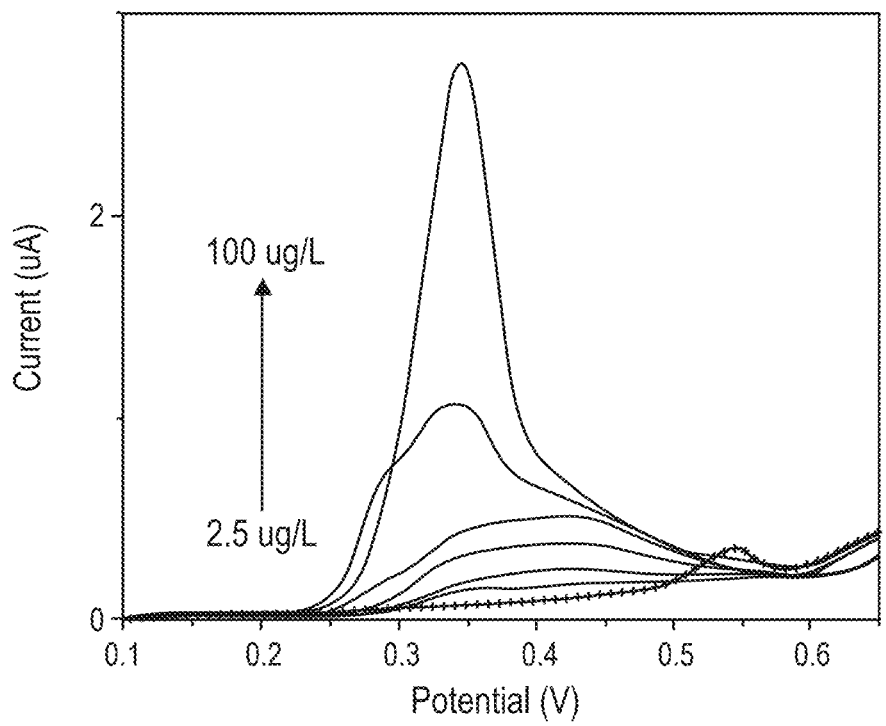
FIGS. 7A and 7B are a set of graphs displaying potential as a function of current for a ultraflat Au (111) thin film surface electrode and a calibration curve, respectively, for various concentrations of As (III), in accordance with the present disclosure.
Figure 7B:
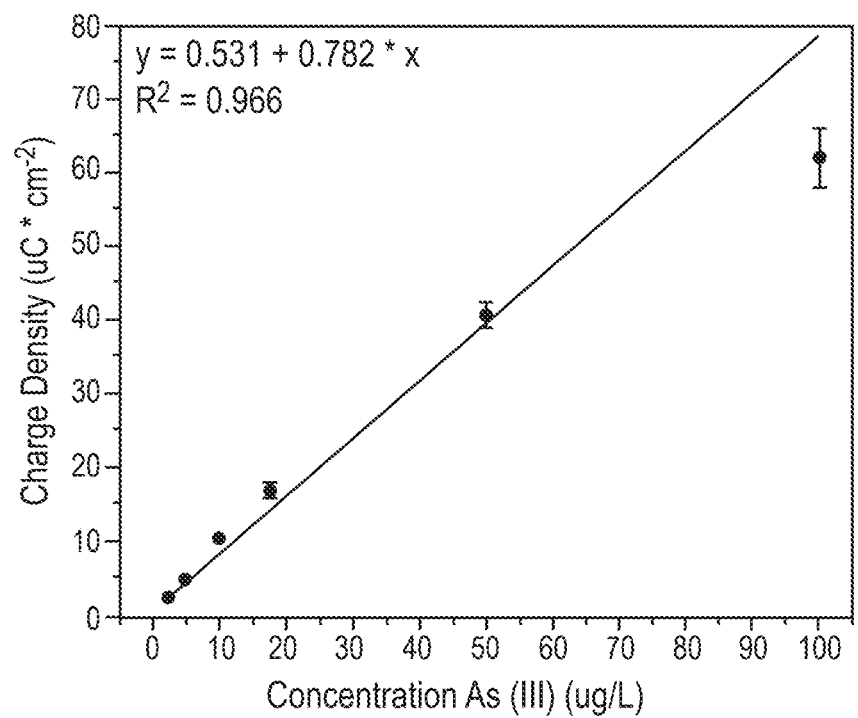

FIGS. 7A and 7B are a set of graphs displaying potential as a function of current for a ultraflat Au (111) thin film surface electrode and a calibration curve, respectively, for various concentrations of As (III), in accordance with the present disclosure. As the concentration of As (III) is increased as indicated in the legend, the associated narrow peak associated with As (III) increases as well. The charge density as a function of the As (III) concentration in µg/L provides a straight line having an $R^2$ value of 0.966 for line having the equation y=0.531+0.782x.

Figures 8A, 8B:
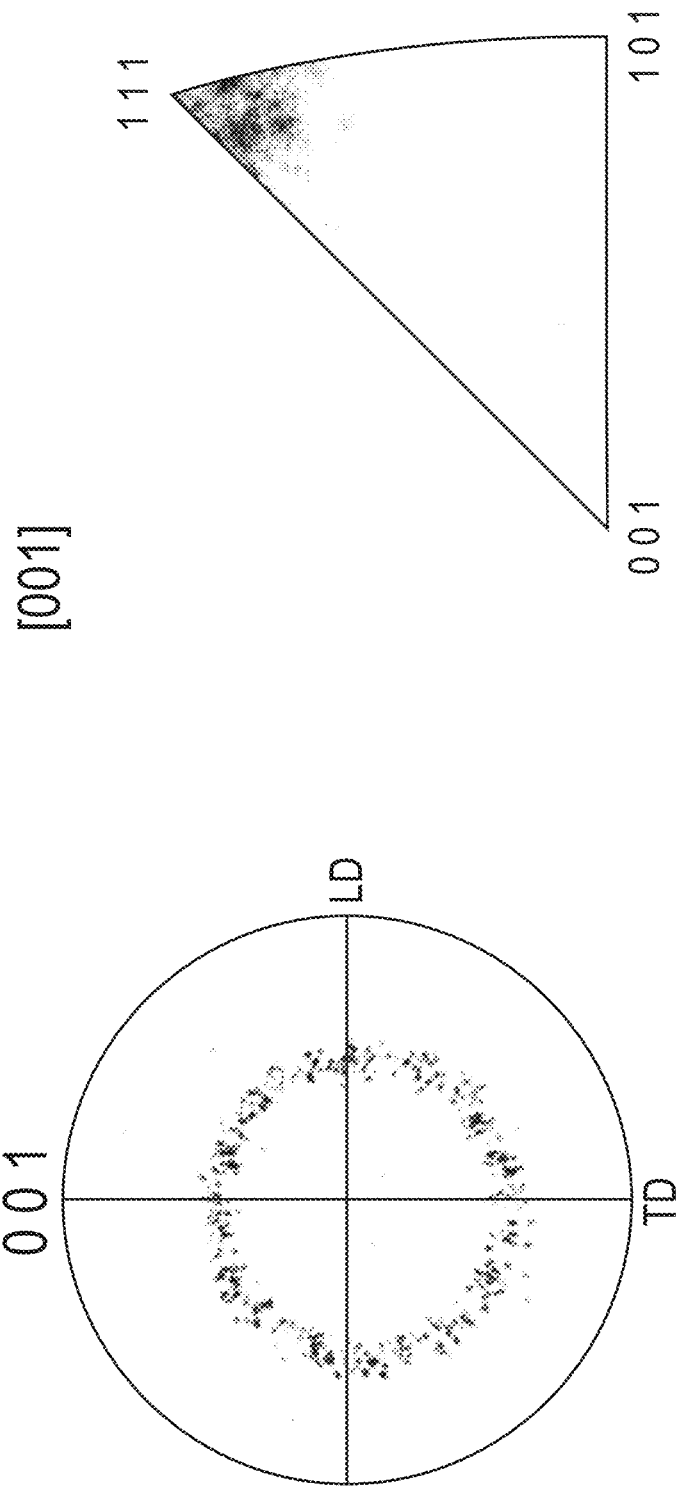
FIGS. 8A and 8B depict electron backscatter diffraction images of an ultraflat Au (111) thin film and a generic Au (111) thin film, respectively, in accordance with the present disclosure.

FIGS. 8A and 8B depict a pole figure and an inverse pole figure, respectively, in accordance with the present disclosure. The pole figure of FIG. 8A shows a circle of points in S1C which indicates that the grains in the thin film are randomly oriented in their in-plane directions. The inverse pole figure of FIG. 8B shows that the vast majority of the domains are oriented in the Au (111) direction. It can further be observed that the surface grain sizes are larger in the ultraflat Au (111) thin film as compared to the generic Au (111) film. The ultraflat Au (111) Thin film has larger grains. Both films were purchased from Platypus Technologies, Madison WI with a primary difference being that the film designed as "ultraflat" is in terms of its surface roughness. While the generic Au (111) thin film has smaller grain size, it is also (111) oriented. However, it was not designed to be "ultraflat" in terms of surface roughness. Both thin films are comprised of flat crystallites where each crystallite has a (111) surface parallel to the surface of the film. The (111) vector is perpendicular to the surface of the thin film and the in-plane vector is disordered or random. The highly oriented (111) texture in an ultraflat poly-oriented crystalline thin film provides suitable, advantaged surfaces for detection of analytes according to the systems and methods described herein.

FIGS. 9A and 9B depict atomic force microscopy images of an ultraflat Au (111) thin film and a generic Au (111) thin film, respectively, in accordance with the present disclosure. The images illustrate a comparative root mean square roughness (RMS) as an indicator of the average roughness. A lower RMS value is indicative of more flatness. The light spots in both FIGS. 9A and 9B are areas where the Au surface of the film is higher, with the ultraflat Au (111) thin film exhibiting much less surface variance as compared to the generic Au (111) thin film.

Figure 10:
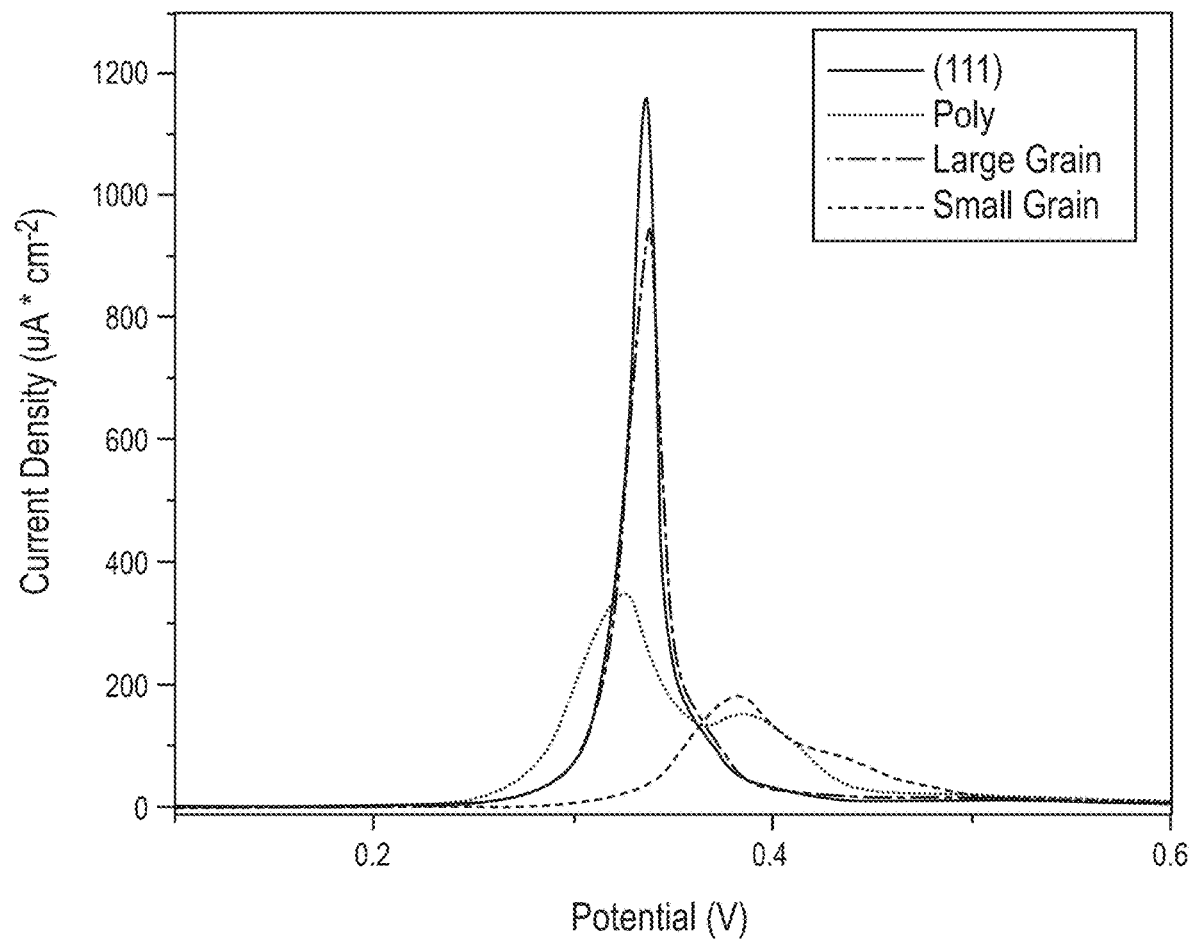
FIG. 10 is a graph depicting linear stripping voltammetry results in $10^{-5}$ M As (III) for electrodes using an ultraflat Au (111) thin film (large grain) and a generic Au (111) thin film (small grain) as compared to another Au (111) single crystal surface and a poly-oriented single crystal, in accordance with the present disclosure.

FIG. 10 is a graph depicting linear stripping voltammetry results in $10^{-5}$ M As (III) for electrodes using an ultraflat Au (111) thin film (large grain) and a generic Au (111) thin film (small grain) as compared to another (111) single crystal surface and a poly-oriented single crystal, in accordance with the present disclosure. The ultraflat Au (111) thin film, also referred to as large grain, shows similar results to the Au (111) single crystal thin film. Furthermore, the generic Au (111) thin film (small grain shows a broad peak more similar to the poly-oriented Au single crystal surface, denoted as poly in the graph of FIG. 10. A peak with higher current density and smaller peak width for As (III) detection indicates a higher sensitivity and selectivity. While comparative surfaces having thin films of gold have predominantly Au (111) surface orientation, they present different responses to As (III) detection. The increased flatness, i.e. lower RMS roughness, provides capabilities for electrodes similar to single crystals for detection of trace analytes in water, as the ultraflat (111) thin film surface provides a narrow distribution of analyte adsorption site energies.

Figure 11A:
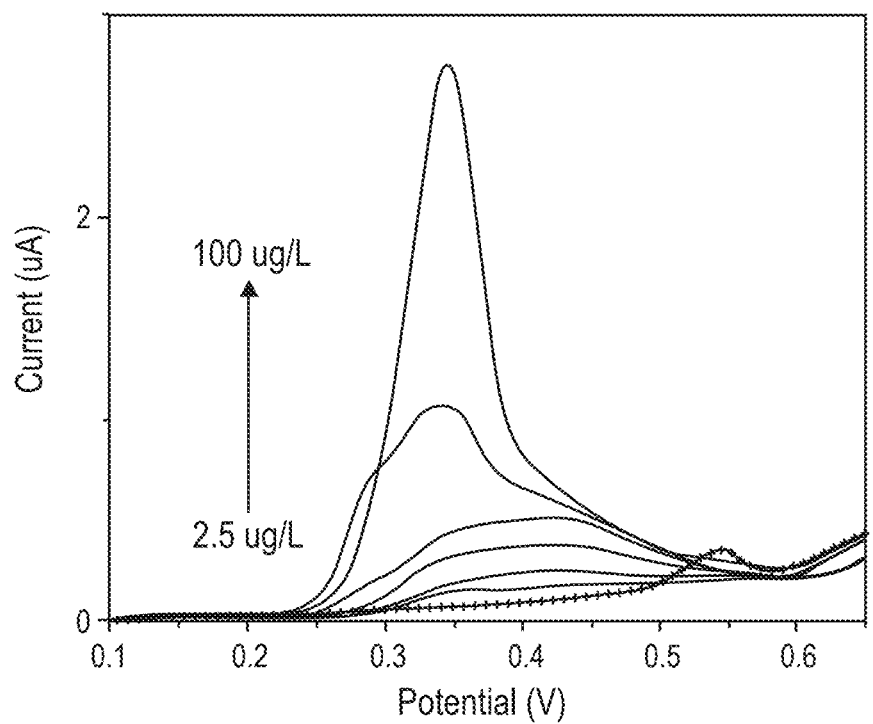
FIGS. 11A and 11B are graphs illustrating linear stripping voltammetry between 2.5 and 100 µg/L for an ultraflat Au (111) thin film and linear stripping voltammetry between 2.5 and 50 µg/L for a generic Au (111) thin film, respectively, in accordance with the present disclosure.
Figure 11B:
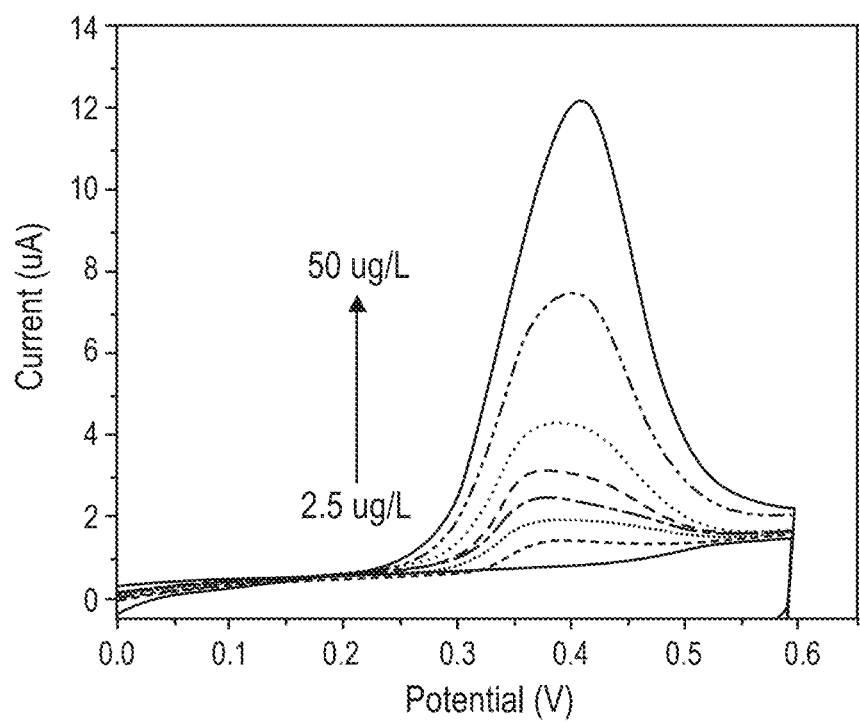

FIGS. 11A and 11B are graphs illustrating linear stripping voltammetry between 2.5 and 100 µg/L for an ultraflat Au (111) thin film and linear stripping voltammetry between 2.5 and 50 µg/L for a generic Au (111) thin film, respectively, in accordance with the present disclosure. It can be observed that for the ultraflat Au (111) thin film in FIG. 11A, a sharper peak at higher concentrations is evident. In FIG. 11B, the generic Au (111) thin film maintains a broader peak shape over the concentration range tested. A sharper peak indicates higher selectivity for As (III) detection as a sharper peak can be more easily distinguished from a peak related to another metal or other analytes in a test solution which would be oxidized at a different potential. The surface flatness effects the sensitivity and selectivity for As (III) detection using linear stripping voltammetry, and although both surfaces as shown in the graphs of FIGS. 11A and 11B, are thin films of gold and have predominantly Au (111) surface orientation, they present different responses to As (III) detection. Therefore, improved or increased flatness, corresponding to a lower surface roughness provides an increased capabilities similar to a single crystal-like behavior for detection of trace As (III), as well as other analytes in water.

Figure 12:
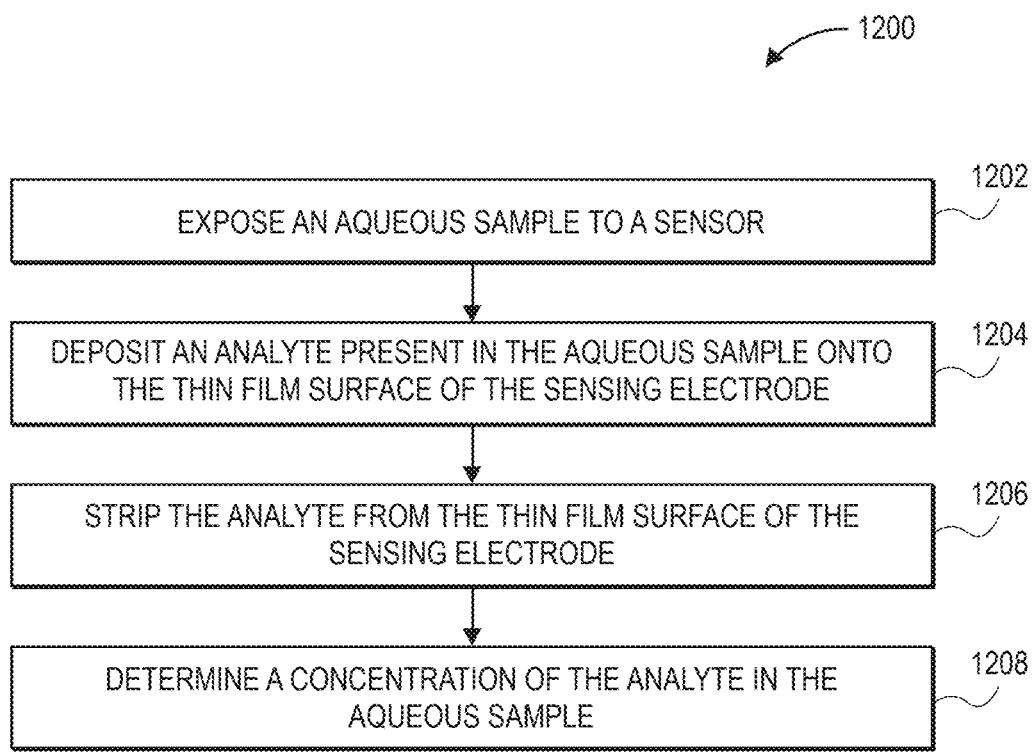
FIG. 12 is a flowchart illustrating a method for aqueous electrochemical analysis, in accordance with the present disclosure.

FIG. 12 is a flowchart illustrating a method for aqueous electrochemical analysis, in accordance with the present disclosure. A method for aqueous electrochemical analysis 1200, as illustrated in FIG. 12, includes exposing an aqueous sample to a sensor 1202, where a sensing electrode having a thin film surface, where the thin film surface of the sensing electrode includes a uniaxial texture that is normal to a plane of the thin film surface, followed by the deposition of an analyte present in the aqueous sample onto the thin film surface of the sensing electrode 1204. Next, the analyte is stripped from the thin film surface of the sensing electrode 1206 and a concentration of the analyte in the aqueous sample can be determined 1208. In exemplary examples, the uniaxial texture of the thin film surface comprises (111) oriented grains. The method for aqueous electrochemical analysis 1200 can include where the thin film surface of the sensing electrode further includes a noble metal, for example, gold. Other illustrative examples of suitable electrode metals are described herein. In the method for aqueous electrochemical analysis 1200, stripping the analyte from the thin film surface of the sensing electrode produces a single peak. The analyte of the method for aqueous electrochemical analysis 1200 includes a metal such as arsenic, lead, copper, iron, chromium, uranium, cadmium, nickel, or a combination thereof. Alternatively, the analyte of the method for aqueous electrochemical analysis 1200 includes an organic compound, such as a phenol, alcohol, organophosphate, halogenated hydrocarbon, aldehyde, ketone, or organic acids or a combination thereof.

Advantages of the present disclosure include instrumentation and methods providing higher peak to background ratio than poly-oriented electrodes, resulting in lower detection limits, decreased interference from other redox species due to narrower oxidation peaks, at much lower costs as compared to devices or apparatus having single crystal gold electrodes. The system and methods of the present disclosure further provide greater stability over multiple CV cycles, enabling more reuse, the applicability of a wide range of possible metal analytes, and in-situ determination of water samples. Methods and devices of the present disclosure provide a means of detection and analysis of redox active ions and molecules in solutions, including non-limiting examples of metal ions such as As, Pb, Cu, Fe, Cr, U, Cd, Ni, and organic molecules such as phenols, alcohols, organophosphates, aldehydes, ketones, organic acids, halogenated hydrocarbons, or combinations thereof. The surface flatness of the ultraflat (111) thin film electrode surface is also advantageous for analyte detection using linear stripping voltammetry with respect to sensitivity and selectivity.

While the present teachings have been illustrated with respect to one or more implementations, alterations and/or modifications may be made to the illustrated examples without departing from the spirit and scope of the appended claims. For example, it may be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It may be appreciated that structural objects and/or processing stages may be added, or existing structural objects and/or processing stages may be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items may be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. The terms "couple," "coupled," "connect," "connection," "connected," "in connection with," and "connecting" refer to "in direct connection with" or "in connection with via one or more intermediate elements or members." Finally, the terms "exemplary" or "illustrative" indicate the description is used as an example, rather than implying that it is an ideal. Other embodiments of the present teachings may be apparent to those skilled in the art from consideration of the specification and practice of the disclosure herein. It is intended that the specification and examples be considered as exemplary only, with a true scope and spirit of the present teachings being indicated by the following claims.

What is claimed is:

1. A device for aqueous electrochemical analysis, comprising:
   a sensor comprising:
      a sensing electrode having a thin film surface;
      a counter electrode coupled to the sensing electrode; and
      a reference electrode coupled to the sensing electrode and the counter electrode; and
         wherein the thin film surface of the sensing electrode comprises a uniaxial texture comprising (111) oriented grains wherein the uniaxial texture is normal to a plane of the thin film surface, and wherein the (111) oriented grains are disordered in an in-plane vector.

2. The device for aqueous electrochemical analysis of claim 1, wherein the thin film surface of the sensing electrode further comprises a noble metal.

3. The device for aqueous electrochemical analysis of claim 2, wherein the noble metal comprises gold.

4. The device for aqueous electrochemical analysis of claim 1, wherein the sensor is disposed on an integrated circuit.

5. The device for aqueous electrochemical analysis of claim 1, wherein the sensor is configured to determine a concentration of a metal in an aqueous sample.

6. The device for aqueous electrochemical analysis of claim 5, wherein the metal comprises arsenic.

7. The device for aqueous electrochemical analysis of claim 5, wherein the metal comprises lead, copper, iron, chromium, uranium, cadmium, nickel, or a combination thereof.

8. The device for aqueous electrochemical analysis of claim 1, wherein the sensor is configured to determine a concentration of an organic compound in an aqueous sample.

9. The device for aqueous electrochemical analysis of claim 8, wherein the organic compound comprises a phenol, alcohol, organophosphate, halogenated hydrocarbon, or a combination thereof.

10. A method for aqueous electrochemical analysis, comprising:
   exposing an aqueous sample to a sensor comprising a sensing electrode having a thin film surface, wherein the thin film surface of the sensing electrode comprises a uniaxial texture comprising (111) oriented grains wherein the uniaxial texture is normal to a plane of the thin film surface, and wherein the (111) oriented grains are disordered in an in-plane vector;
   depositing an analyte present in the aqueous sample onto the thin film surface of the sensing electrode;
   stripping the analyte from the thin film surface of the sensing electrode; and
   determining a concentration of the analyte in the aqueous sample.

11. The method for aqueous electrochemical analysis of claim 10, wherein the thin film surface of the sensing electrode further comprises a noble metal.

12. The method for aqueous electrochemical analysis of claim 11, wherein the noble metal comprises gold.

13. The method for aqueous electrochemical analysis of claim 10, wherein stripping the analyte from the thin film surface of the sensing electrode produces a single peak.

14. The method for aqueous electrochemical analysis of claim 10, wherein the analyte comprises a metal.

15. The method for aqueous electrochemical analysis of claim 14, wherein the metal comprises arsenic.

16. The method for aqueous electrochemical analysis of claim 14, wherein the metal comprises lead, copper, iron, chromium, uranium, cadmium, nickel, or a combination thereof.

17. The method for aqueous electrochemical analysis of claim 10, wherein the analyte comprises an organic compound.

18. The method for aqueous electrochemical analysis of claim 17, wherein the organic compound comprises a phenol, alcohol, organophosphate, halogenated hydrocarbon, or a combination thereof.

* * * * *